United States Patent
Walewski

(10) Patent No.: US 9,319,134 B2
(45) Date of Patent: Apr. 19, 2016

(54) METHOD AND DEVICE FOR OPTICALLY TRANSMITTING DATA

(75) Inventor: Joachim Walewski, Unterhaching (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 131 days.

(21) Appl. No.: 13/266,405

(22) PCT Filed: Apr. 28, 2010

(86) PCT No.: PCT/EP2010/055703
§ 371 (c)(1),
(2), (4) Date: Oct. 26, 2011

(87) PCT Pub. No.: WO2010/125093
PCT Pub. Date: Nov. 4, 2010

(65) Prior Publication Data
US 2012/0045221 A1  Feb. 23, 2012

(30) Foreign Application Priority Data
Apr. 28, 2009 (DE) .......................... 10 2009 019 202

(51) Int. Cl.
*H04B 10/116* (2013.01)
*H04B 10/11* (2013.01)
*H04B 10/114* (2013.01)

(52) U.S. Cl.
CPC ................................ *H04B 10/1141* (2013.01)

(58) Field of Classification Search
CPC ............. H04B 10/1141; H04B 20/112; H04B 10/116; H04B 10/11
USPC ................................... 398/182–201, 118–131
See application file for complete search history.

(56) References Cited

U.S. PATENT DOCUMENTS

| | | | | |
|---|---|---|---|---|
| 5,822,373 A * | 10/1998 | Addy | ............................ | 375/259 |
| 6,850,709 B1 * | 2/2005 | Gfeller et al. | .................. | 398/118 |
| 6,931,030 B1 * | 8/2005 | Dogan | ............................ | 370/509 |
| 7,050,518 B1 * | 5/2006 | Keller et al. | ................... | 375/354 |

(Continued)

FOREIGN PATENT DOCUMENTS

| | | | | |
|---|---|---|---|---|
| EP | 2101424 A1 | 9/2009 | ............. | G08C 23/04 |
| WO | 02/25842 A2 | 3/2002 | ............. | H04B 10/10 |

(Continued)

OTHER PUBLICATIONS

Rajagopal et al, IEEE 802.15.7 VLC PHY/MAC Proposal—Samsung/ETRI, Oct. 2009, IEEE 802.15 Wireless Personal Area Network, Entire Document.*

(Continued)

*Primary Examiner* — Ken Vanderpuye
*Assistant Examiner* — Dibson Sanchez
(74) *Attorney, Agent, or Firm* — Slayden Grubert Beard PLLC

(57) ABSTRACT

In a method for optically transmitting data by means of a pulse-width-modulated light source (LED), a pulse duty factor (N) of a pulse width modulation is specified to set the brightness of the light source (LED). A bright time (T) is divided into at least a first and second partial bright time using at least one blanking so that the data (DATA) to be transmitted are encoded by the start and time length of the at least one blanking. The sum of the partial bright times within the pulse width modulation cycle substantially corresponds to the bright time according to the specified pulse duty factor.

22 Claims, 2 Drawing Sheets

(56) References Cited

U.S. PATENT DOCUMENTS

| | | | |
|---|---|---|---|
| 7,336,627 B1* | 2/2008 | Hasegawa et al. | 370/282 |
| 7,689,130 B2* | 3/2010 | Ashdown | 398/172 |
| 7,949,259 B2* | 5/2011 | Suzuki | 398/172 |
| 7,952,292 B2* | 5/2011 | Vegter et al. | 315/153 |
| 8,188,878 B2* | 5/2012 | Pederson et al. | 340/815.45 |
| 8,253,353 B2* | 8/2012 | Baggen et al. | 315/308 |
| 8,320,768 B2* | 11/2012 | Shin et al. | 398/135 |
| 8,401,394 B2* | 3/2013 | Walewski | 398/130 |
| 8,495,476 B2* | 7/2013 | Abu-Surra et al. | 714/784 |
| 8,588,616 B2 | 11/2013 | Langer et al. | 398/118 |
| 8,605,776 B2* | 12/2013 | Suenaga et al. | 375/224 |
| 8,744,273 B2 | 6/2014 | Riedl et al. | 398/183 |
| 2001/0055353 A1* | 12/2001 | Rybicki et al. | 375/353 |
| 2003/0165206 A1* | 9/2003 | Karr | 375/368 |
| 2003/0222587 A1* | 12/2003 | Dowling et al. | 315/149 |
| 2007/0024571 A1* | 2/2007 | Maniam et al. | 345/102 |
| 2007/0092264 A1* | 4/2007 | Suzuki et al. | 398/189 |
| 2008/0215391 A1* | 9/2008 | Dowling et al. | 705/7 |
| 2008/0272276 A1* | 11/2008 | Huang et al. | 250/205 |
| 2009/0010654 A1* | 1/2009 | Shin | H04B 10/116 398/135 |
| 2009/0022112 A1* | 1/2009 | Shin | H04B 10/1149 370/336 |
| 2009/0110405 A1* | 4/2009 | Lee et al. | 398/130 |
| 2009/0196613 A1* | 8/2009 | Linnartz | 398/78 |
| 2009/0214225 A1* | 8/2009 | Nakagawa et al. | 398/191 |
| 2010/0135669 A1* | 6/2010 | Kim et al. | 398/130 |
| 2010/0166016 A1* | 7/2010 | Moss et al. | 370/474 |
| 2010/0327764 A1* | 12/2010 | Knapp | 315/250 |
| 2011/0064416 A1* | 3/2011 | Rajagopal et al. | 398/130 |
| 2012/0045221 A1 | 2/2012 | Walewski | 398/191 |

FOREIGN PATENT DOCUMENTS

| | | | | |
|---|---|---|---|---|
| WO | 2007/004530 A1 | 1/2007 | | H04B 10/10 |
| WO | 2008/001262 A1 | 1/2008 | | H04B 10/10 |
| WO | 2010/125093 A1 | 11/2010 | | H04B 10/114 |

OTHER PUBLICATIONS

Narra et al, An effective LED Dimming Approach, Oct. 2004, IEEE Industry Application Conference, vol. 3, Entire Document.*

Haas et al , IEEE 1355 DS Links Electrical and Optical Transmission Media, Jul. 1997, CERN, Geneva, Switzerland and University of Liverpool, Liverpool, England, All Document.*

Komine et al, Adaptive Equalization for Indoor Visible Light Wireless Communication Systems, Oct. 2005, IEEE, pp. 294-298.*

Elgala et al, OFDM Visible Light Wireless Communication Based on White LEDs, 2007, IEEE, pp. 2185-2189.*

Sugiyama, H., et al., "Experimental Investigation of Modulation Method for Visible-Light Communications", Institute of Electronics Information and Communication Engineers, IEICE Trans. Commun., vol. E89-B, No. 12; pp. 3393-3400, Dec. 2006.

Sugiyama, H., et al., "Brightness Control Methods for Illumination and Visible-Light Communication Systems", Proceedings of the Third International Conferece on Wireless and Mobile Communications: 6 pages, 2007.

International PCT Search Report and Written Opinion, PCT/EP2010/055703, 11 pages, Aug. 31, 2010.

Chinese Office Action, Application No. 201080018947.5, 10 pages, Dec. 30, 2013.

Chinese Office Action, Application No. 201080018947.5, 11 pages, Sep. 9, 2014.

* cited by examiner

METHOD AND DEVICE FOR OPTICALLY TRANSMITTING DATA

CROSS-REFERENCE TO RELATED APPLICATIONS

This application is a U.S. National Stage Application of International Application No. PCT/EP2010/055703 filed Apr. 28, 2010, which designates the United States of America, and claims priority to German Application No. 10 2009 019 202.6 filed Apr. 28, 2009. The contents of which are hereby incorporated by reference in their entirety.

TECHNICAL FIELD

The invention relates to a method and a device for optically transmitting data by means of a pulse-width-modulated light source.

BACKGROUND

The wide distribution of mobile terminals, such as mobile telephones, for example, demands fast data transmission via wireless interfaces and local wireless data networks. Light-emitting diodes (LEDs) can be used for lighting rooms in buildings. Light-emitting diodes, also referred to as LEDs, feature low energy consumption and long service life. Light-emitting diodes provided for lighting rooms inside buildings are modulated with pulse width modulation to enable the luminance level within a room to be set according to the respective requirements. Pulse width modulation for brightness control is also described by experts as "dimming".

Methods for simultaneous brightness control and data transmission via a light source are already known. It has already been proposed in a patent application filed at the German Patent and Trademark Office on 28.04.2009, to modify a pulse duty factor of the pulse width modulation in individual pulse-width-modulation cycles so that data to be transmitted is encoded by means of such a cycle-dependent pulse duty factor without the set brightness experiencing a change overall. In this case, in order to maintain the set brightness, the value of an arithmetic mean generated over a large number of cycle-dependent pulse duty factors should essentially correspond to the set pulse duty factor.

SUMMARY

According to various embodiments, a method and a device for optically transmitting data via a dimmable light source can be created, which ensures a higher data transfer rate compared to the prior art.

According to an embodiment, in a method for optically transmitting data by means of a pulse-width-modulated light source, a pulse duty factor of a pulse width modulation is specified to set the brightness of the light source as a ratio between a blanking time of the light source and a period of a pulse width modulation cycle, wherein a difference between the period and the blanking time corresponds to a bright-up time of the light source within one pulse width modulation cycle, with at least one blanking, the bright-up time is divided into at least one first and second partial bright-up time so that the data to be transmitted is encoded by means of the start and time period of the at least one respective blanking, and the sum of the partial bright-up times within the pulse width modulation cycle essentially corresponds to the bright-up time according to the specified pulse duty factor.

According to a further embodiment, the light source can be a light-emitting diode. According to a further embodiment, the data can be exchanged wirelessly with a mobile terminal. According to a further embodiment, the data can be transmitted in at least one symbol, and wherein a symbol is defined by at least one binary bit. According to a further embodiment, a value of a symbol can be encoded at least partially by an arrangement of the blanking within the pulse width modulation cycle. According to a further embodiment, training sequences containing training symbols can be provided at the start of a data transmission. According to a further embodiment, a training symbol can be formed by a minimum distance between at least two blankings. According to a further embodiment, a training symbol can be formed by a maximum distance between the first and the last blanking. According to a further embodiment, with a pulse duty factor set to zero, an optical power of the light source can be increased by a factor which corresponds to a quotient of a time period of the pulse width modulation cycle and of a value of the time period of the pulse width modulation cycle reduced by a time period of the blankings.

According to a further embodiments, a device for optically transmitting data by means of a pulse-width-modulated light source may comprise a data modulation module for receiving data to be transmitted and a settable pulse duty factor of a pulse width modulation as a ratio between a blanking time of the light source and a period of a pulse width modulation cycle, wherein a difference between the period and a blanking time corresponds to a bright-up time of the light source within one pulse width modulation cycle; wherein the data modulation module is set up for the definition of at least one blanking by which the bright-up time is divided into at least one first and second partial bright-up time, so that the data to be transmitted is encoded by means of the start and/or time period of the at least one respective blanking, so that the sum of the partial bright-up times within the pulse width modulation cycle essentially corresponds to the bright-up time according to the specified pulse duty factor.

According to a further embodiment of the device, the device may have means for implementing the method as described above.

BRIEF DESCRIPTION OF THE DRAWINGS

In order to explain further features, various embodiments of the device and method for optically transmitting data by means of a pulse-width-modulated light source are described below with reference to the drawing;
where.

DETAILED DESCRIPTION

Figure 1A:
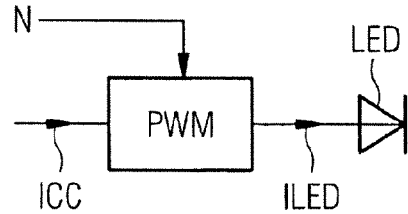
FIG. 1A shows a schematic representation of a conventional pulse-width-modulated light source.

According to various embodiments, a method for optically transmitting data by means of a pulse-width-modulated light source can be created, wherein for brightness control of the pulse-width-modulated light source a set pulse duty factor is specified as the ratio between a blanking time of the light source and one period of a pulse width modulation cycle.

According to various embodiments, a bright-up time within one pulse width modulation cycle having at least one blanking is divided into at least a first and second partial bright-up time so that the data to be transmitted is encoded by means of the start and/or time period of the at least one respective blanking. In this case the sum of the partial bright-up times within the pulse width modulation cycle essentially corresponds to the bright-up time according to the specified pulse duty factor.

The various embodiments are based on the idea of leaving unchanged the set pulse duty factor, which corresponds to a brightness of the pulse-width-modulated light source set via a dimming factor, so that viewed within the same pulse width modulation cycle an average pulse duty factor is produced which corresponds to the set pulse duty factor.

In other words, according to various embodiments the bright-up time to be set by the brightness control, which would be constant with a pulse width modulation above a correspondingly set brightness over a respective region of a pulse width modulation cycle, is modulated in individual time slots ("multi-level modulation"), so that data transmission by means of encoding is possible via the pulse-width-modulated bright-up time within a pulse modulation cycle, without the brightness set by means of the specified pulse width modulation being changed over the pulse width modulation cycle and overall.

According to various embodiments, here the inertia of the human eye, which cannot perceive a transient change in the pulse width modulation as perceptible differences in brightness, is utilized. Incidentally, this principle is already employed by the "first" pulse width modulation for brightness control itself.

A particular advantage of the method according to various embodiments which should be mentioned is an achievable increase in the data transfer rate that is many times that of conventional methods.

According to an embodiment, the light source is constructed as a light-emitting diode, which offers in particular the advantage of a short and precise turn-on time.

Various embodiments can be preferably used for a wireless exchange between the light source and a mobile terminal.

According to one embodiment, data transmission takes the form of symbols, it being possible for one symbol to consist of one or more binary bits.

Furthermore, according to a further embodiment, the value of a symbol is encoded in a pulse width modulation cycle by an arrangement of the blanking within the signal characteristic. This embodiment corresponds to pulse position modulation in which an arrangement of the partial bright-up times is modified regardless of the specification.

In the simplest development of this embodiment, here the position of the bright-up time, that is to say when the light source is switched on—can be exchanged with that of the blanking time—that is to say when the light source is switched off—in order to encode a further binary bit in this way. Incidentally, the above-mentioned pulse position modulation also does not result in a perceptible change in the set brightness.

Furthermore, according to further embodiments, a device for optically transmitting data by means of a pulse-width-modulated light source can be created.

FIG. 1A shows a device known from the prior art, consisting of a light source LED and a pulse width modulator PWM which generates a pulse-width-modulated carrier signal. The pulse width modulator PWM is supplied by a supply current ICC. The supply current ICC is a DC current of variable magnitude, for example. Brightness control of the light source LED is achieved by setting a dimming factor N, it being possible, for example, for a manipulated variable of a corresponding adjuster—not shown—to influence the dimming factor and for the manipulated variable to be fed to the pulse width modulator. Here the dimming factor N corresponds to a pulse duty factor of the current ILED generated on the basis of the set dimming factor by the pulse width modulator PWM, said current having a pulse width modulation which in its time characteristic corresponds to a characteristic of the optical power of the light source LED shown below.

The further description of the figures is given with further reference to the function units of each of the preceding figures. In this connection, identical reference characters in different figures represent identical function units.

Figure 2A:
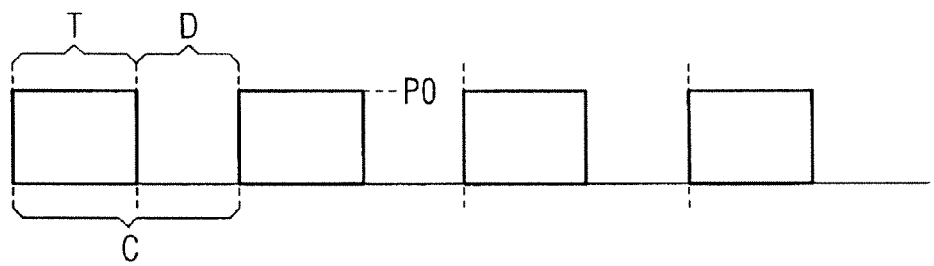
FIG. 2A shows a signal diagram for explaining the mode of operation of a conventional pulse-width-modulated light source.

FIG. 2A shows a time characteristic of the optical power of the light source LED, it being possible for the time characteristic of the optical power to appear in sequence with the pulse-width-modulated current ILED which has an essentially identical characteristic.

Four pulse width modulation cycles C are shown in FIG. 2A, it being possible for a respective cycle C to consist of a respective bright-up time T and a blanking time D. For the sake of clarity, in the drawing the respective bright-up time T and blanking time D are denoted only for the first pulse width modulation cycle C illustrated at the far left. A respective cycle in FIG. 2A starts in each case at a broken line shown perpendicular to the horizontal axis and correspondingly ends at the following broken line.

The light source is activated during the bright-up time T and emits optical power with an optical performance characteristic P0. During the blanking time D the light source is turned off and radiates a power which is essentially zero.

The pulse width modulation of the light source LED is used to set the optical power, it being possible for the inertia of the human eye to be utilized in such a way that due to the time period of one cycle C the bright-up times T and blanking times D are sensed as continuous optical power.

The brightness of the light source LED is variable depending on the dimming factor N, which is indicated in the following mathematical notation as η, and the quotient between the blanking time D—indicated in the following mathematical notation as $T_d$—within a cycle C, as well as the cycle time C—indicated in the following mathematical notation as $T_c$—which gives $$\eta = \frac{T_d}{T_c} \quad (1)$$

The dimming factor η is identical to the pulse duty factor likewise defined as the quotient between the blanking time D and the cycle time C.

With a dimming factor of η=1 the optical radiated power becomes 0, that is to say complete darkness; with a dimming factor of η=0 the perceived optical power corresponds to the optical performance characteristic P0, that is to say the maximum available brightness.

The dimming factor η shown graphically in FIG. 2A is approximately 0.46.

Various embodiments may be based on the object of creating measures to additionally provide the pulse-width-modulated light source LED shown in FIG. 2A for optical data transmission.

According to various embodiments, the bright-up time T is divided into at least a first and second partial bright-up time using at least one blanking, so that the data to be transmitted is encoded by means of the start and/or time period of the at least one blanking.

Figure 2B:
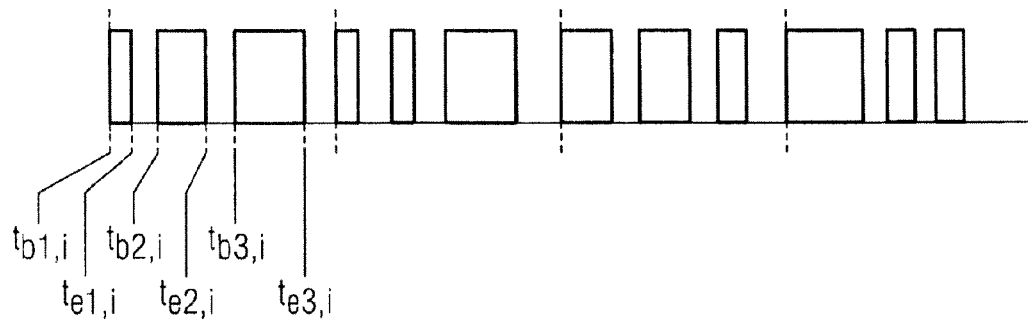
FIG. 2B shows a signal diagram for explaining the mode of operation of the method for optically transmitting data by means of a pulse-width-modulated light source according to various embodiments.

FIG. 2B shows a time sequence diagram of a pulse width modulation using the means according to various embodiments. As in FIG. 2A and also in FIG. 2B the optical power of the light source LED is plotted on the perpendicular axis over the horizontal time axis. Analogous to the illustration of FIG. 2A, a respective cycle in FIG. 2b starts in each case at a broken line shown perpendicular to the horizontal axis and correspondingly ends at the following broken line.

Firstly, in the illustration of FIG. 2B, reference is made to the first cycle C in the left-hand part of the time sequence diagram, in which the entire bright-up time T of the first cycle shown in FIG. 2A is "divided" into three partial bright-up times, so that the sum of the partial bright-up times within the pulse width modulation cycle C corresponds to the bright-up time T of FIG. 2A. A first or i×n bright-up time $t_{b1,i}$ in the i×n pulse width modulation cycle C, also first cycle C in the following, starts at the far left-hand end of the time sequence diagram shown in FIG. 2B. The first partial bright-up time ends at the time $t_{e1,i}$. The first partial bright-up time is separated by an immediately following blanking from a second bright-up time which starts at a time $t_{b2,I}$ and changes at a time $t_{e2,i}$. A second blanking, which ends with the start $t_{b3,I}$ of a third bright-up time, follows the second partial bright-up time. The said third partial bright-up time ends at the time $t_{e3,i}$.

In a second cycle C following the first cycle C, the entire bright-up time T of the second cycle of FIG. 2A is in turn "divided" into three partial bright-up times.

According to various embodiments, in the second cycle C the sum of the partial bright-up times in FIG. 2B corresponds to the bright-up time T of FIG. 2A.

Based on a different symbol now to be transmitted in the symbol sequence to be transmitted for the data transfer, in the second cycle C the encoding of the signal sequence, that is to say the time sequence of the individual blankings, has changed in the second cycle C. In the second cycle C, it can be seen from FIG. 2B that, according to its start time and its time period, in the second cycle a first blanking—not shown—corresponds to the first blanking in the first cycle. However, a second blanking following a second partial bright-up time starts earlier than the second blanking in the first cycle, but incidentally has a time period that is identical to the second blanking in the first cycle.

As FIG. 2A shows, in a third cycle C following the second cycle C the entire bright-up time T of the third cycle C is again "divided" into three partial bright-up times.

According to various embodiments, in the third cycle C the sum of the partial bright-up times of FIG. 2B also corresponds to the bright-up time T of FIG. 2A.

Based on a different symbol now to be transmitted in the symbol sequence to be transmitted for the data transfer, the encoding of the signal sequence, that is to say the time sequence of the individual blankings, has changed again in the third cycle C. In the third cycle C it can be seen from FIG. 2B that according to its start time a first blanking—not shown—differs from the first blanking in the first cycle as well as from the first blanking in the second cycle.

In a fourth cycle C following the third cycle C, based on a different symbol now to be transmitted, the encoding of the signal sequence is again changed.

FIG. 2b illustrates an embodiment according to which one division of the bright-up time T with two blankings is divided into three partial bright-up times.

For the sake of simplicity, FIG. 2B shows only blankings whose time periods have identical values in each case. However, in order to achieve greater encoding depth, according to an alternate embodiment it is also recommended to vary the time period of the respective blankings in accordance with the chosen encoding depth using the method according to various embodiments.

In summary it should be emphasized that a large number of possible encoding values are produced by means of the start and by means of the time period of a respective blanking.

For a selected embodiment with two blankings as shown in FIG. 2B, a number of possible symbols #s to be encoded is given by $$\#s = (N - a - g - 1)\left(\frac{N}{2} - 1 - \frac{3g}{2} - \frac{3a}{2}\right) - \frac{1}{2}(1 + g + a)(2 + g + a)$$

where
s is the number of possible symbols,
N is the total time period of the blocks divided by blankings, that is to say, as shown by FIG. 2B, the dimensionless value of the time period $t_{e3,i} - t_{b1,i}$,
a is a minimal permissible length of the first partial bright-up time,
g is a minimal permissible length of the second partial bright-up time.

The magnitude of the symbol length can be derived from a relationship illustrated in FIG. 3 between the magnitudes B and B' explained below. In this case, for the sake of simplicity, a value of 1 is assumed for the values a and g. Furthermore, in principal there are $2^B$ possible positions for the blankings within the bright-up time.

Here a binary coding according to $\#s = (2^B - 1)$ is assumed for a number of possible symbols #s.

Figure 3:
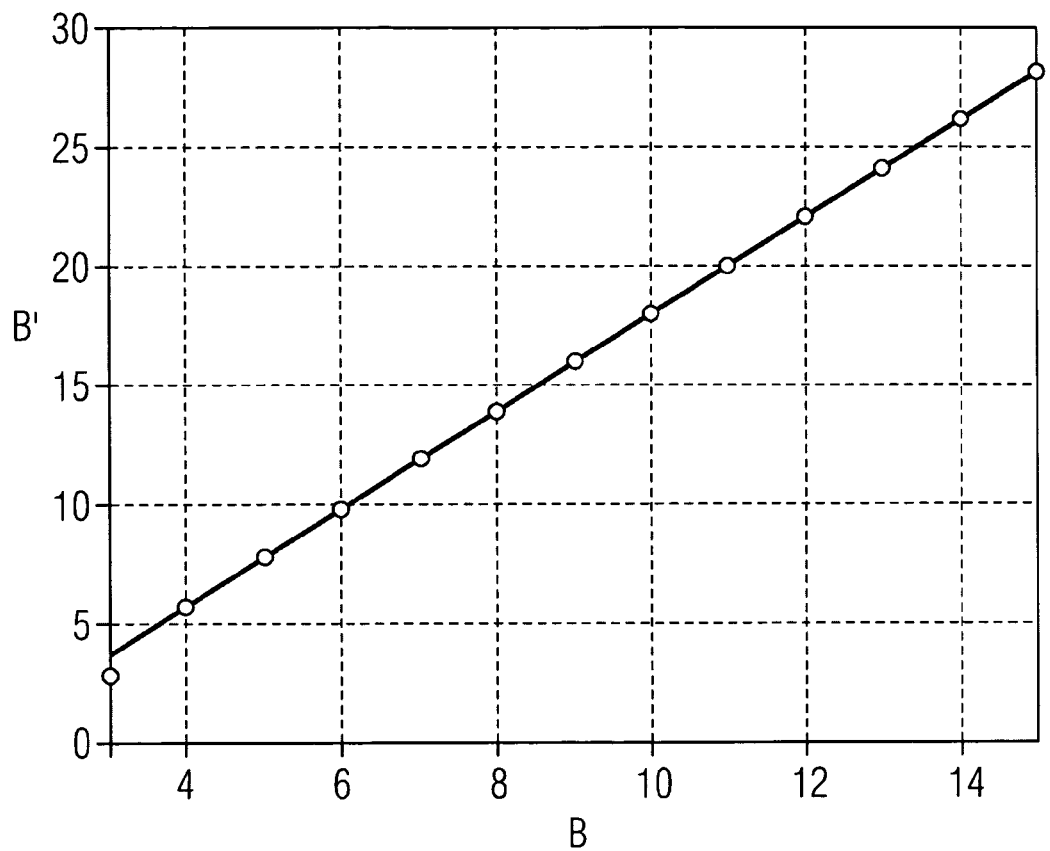
FIG. 3 shows a graphical representation of a relationship showing the influence of determinants on the number of possible symbol lengths.

In this case the value of B' illustrated on the perpendicular axis of the relationship shown in FIG. 3 corresponds to a larger binary number represented by a respective symbol. The value B plotted on the horizontal axis is the nearest whole number associated with B'. Here very large values of N produce the linear approximation $$B' \approx 2.0074B - 2.1576$$

Similar relationships can be derived for three or more blankings.

Figure 1B:
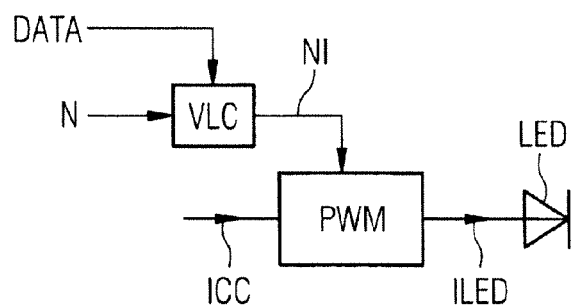
FIG. 1b shows a schematic representation of an embodiment of the device for optically transmitting data by means of a pulse-width-modulated light source.

FIG. 1B represents an arrangement for transmitting data by means of a pulse-width-modulated light source according to various embodiments. In addition to the function components known from FIG. 1A, a data modulation module VLC according to various embodiments is provided, by means of which, unlike the arrangement of FIG. 1A, signal data NI is fed to the pulse width modulator PWM.

According to various embodiments, the signal data NI is calculated from the data DATA fed to the data modulation module VLC and from the dimming factor N used for adjusting the brightness. The signal data NI is available as digital data, for example, which characterizes the time values $t_{b1,i}$, $t_{e1,i}$ etc. known from FIG. 2B for example.

From the signal data NI the pulse width modulator PWM of FIG. 1B synthesizes a current ILED which has a time characteristic as shown in FIG. 2B.

It goes without saying that an exemplary embodiment as shown in FIG. 1B is understood to be just an example and that in a practical realization several light sources can be provided. In an alternate embodiment the calculation and synthesizing of the pulse-width-modulated characteristic according to various embodiments can be directly implemented in a communications module for example.

In a practical realization of various embodiments a standard light-emitting diode with a minimum achievable pulse length of 4 ns is selected, for example. A repetition rate of up to 500 kHz is given for typical pulse width modulation.

The shortest pulse achievable with the said standard light-emitting diode is approximately 4 ns long, so that 625 pulses occur in one cycle, which corresponds to a B of 9. With only one blanking and a very small dimming factor a data transfer rate of 4.5 Mbit/s can be achieved, thus:

9 bits·500 kHz=4.5 Mbit/s

According to various embodiments, by simply increasing the number of blankings to a value of two this rate can be increased to a data transfer rate of 17 bit·500 kHz=8.5 Mbit/s In the case of undimmed lighting, in order to transmit data with maximum brightness, that is to say $\eta=0$, according to a further embodiment the procedure is as follows. In this case provision is made for the intended number of blankings to be retained and for the emitted optical power to be correspondingly increased so that a contribution of the blankings to the reduction of the luminance level is evened out.

If, for example, cycle C has a time period which corresponds to a period of 625 blanking times, then the optical performance characteristic P0 is increased by a value which corresponds to two blanking times. In the present example the optical performance characteristic P0 is increased by a value of 625/623, that is to say approximately 0.5%.

Since therefore the average emitted optical output remains unchanged, data can be transmitted even with undimmed light.

An increase in the dimming factor is accompanied by a reduction in the bright-up time T available for the encoding. For shorter bright-up times, from the point of view of the transmitted data rate it can be advantageous to reduce the number of blankings.

To take account of an adjustment to the luminance level and therefore a change in the bright-up time T, it is also proposed to transmit training sequences containing training symbols at regular intervals and at least once at the start of a data transmission.

For example, such training sequences can comprise training symbols at minimal spacing from the blankings. Furthermore, these training sequences can contain training symbols in which the outermost two blankings have a maximum spacing.

The intended number of blankings and their largest utilized spacing can therefore be simply determined at the other end.

Moreover, training sequences from the other end facilitate synchronization with the light source by recovering the timing from the optical signal.

The method according to various embodiments for optically transmitting data causes no electromagnetic waves and also cannot be influenced by electromagnetic waves. The method according to various embodiments can be used, in particular, when LED lighting is already provided. In this case the light-emitting diodes can be addressed by means of a power line transmission method, for example.

The data transmission is realized by means of an easily screened communication medium. Since the data is optically transmitted it can be easily screened from its surroundings by a wall or a curtain. Bug-proofing can therefore be achieved.

The method according to various embodiments allow secure optical transmission of data by means of a dimmable light-emitting diode LED to portable terminals inside an illuminated room and is insensitive to radio signals. Any type of light-emitting diodes can be employed, for example light-emitting diodes which produce white light. Alternately, light-emitting diodes with a narrower modulation bandwidth than white light-emitting diodes can be used.

What is claimed is:

1. A method for optically transmitting data using a pulse-width-modulated light source, the method comprising:
   specifying a pulse duty factor of a pulse width modulation to set the brightness of the light source as a ratio between a blanking time of the light source and a period of a pulse width modulation cycle, wherein a difference between the period and the blanking time corresponds to a bright-up time of the light source within one pulse width modulation cycle, and
   dividing the bright-up time of the pulse width modulation cycle into a plurality of partial bright-up times separated by at least one blanking to transmit a data symbol,
   wherein each blanking has a selected start time and time period,
   wherein the data symbol transmitted during the pulse width modulation cycle is defined as a function of the respective start times of all of the blankings within that pulse width modulation cycle,
   wherein the sum of the partial bright-up times within the pulse width modulation cycle essentially corresponds to the bright-up time according to the specified pulse duty factor; and
   providing training sequences at least at the start of a data transmission.

2. The method according to claim 1, wherein the light source is a light-emitting diode.

3. The method according to claim 1, wherein the data is exchanged wirelessly with a mobile terminal.

4. The method according to claim 1, wherein the data is transmitted in at least one symbol, and wherein a symbol is defined by at least one binary bit.

5. The method according to claim 1, wherein a value of a symbol is encoded at least partially by an arrangement of the blanking within the pulse width modulation cycle.

6. The method according to claim 1, wherein a training symbol corresponds to a minimum distance measured between at least two blankings.

7. The method according to claim 1, wherein a training symbol corresponds to a maximum distance measured between the first and the last blanking.

8. The method according to claim 7, wherein, for transmitting data without dimming, an optical power of the light source is increased by a factor which corresponds to a quotient of (a) a time period of the pulse width modulation cycle and (b) the time period of the pulse width modulation cycle reduced by a time period of the blankings.

9. The method according to claim 1, wherein the plurality of partial bright-up times and at least one blanking of the pulse width modulation cycle are distributed across the full period of that pulse width modulation cycle.

10. The method according to claim 1, wherein the pulse duty factor is above 50%.

11. The method according to claim 1, wherein the data symbol transmitted during the pulse width modulation cycle is defined as a function of the respective start times and time periods of all of the blankings within that pulse width modulation cycle.

12. A device for optically transmitting data comprising:
    a pulse-width-modulated light source; and a data modulation module for receiving data to be transmitted and a settable pulse duty factor of a pulse width modulation as a ratio between a blanking time of the light source and a period of a pulse width modulation cycle, wherein a difference between the period and a blanking time corresponds to a bright-up time of the light source within one pulse width modulation cycle;

wherein, the data modulation module is configured to divide the bright-up time into a plurality of partial bright-up times separated by at least one blanking to transmit a data symbol, wherein each blanking has a selected start time and time period, wherein the data symbol transmitted during the pulse width modulation cycle is defined as a function of the respective start times of all of the blankings within that pulse width modulation cycle, wherein the sum of the partial bright-up times within the pulse width modulation cycle essentially corresponds to the bright-up time according to the specified pulse duty factor; and wherein the pulse-width-modulated light source provides training sequences at least at the start of a data transmission.

13. The device according to claim 12, wherein the light source is a light-emitting diode.

14. The device according to claim 12, wherein the data is exchanged wirelessly with a mobile terminal.

15. The device according to claim 12, wherein the data is transmitted in at least one symbol, and wherein a symbol is defined by at least one binary bit.

16. The device according to claim 12, wherein a value of a symbol is encoded at least partially by an arrangement of the blanking within the pulse width modulation cycle.

17. The device according to claim 12, wherein a training symbol corresponds to a minimum distance measured between at least two blankings.

18. The device according to claim 12, wherein a training symbol corresponds to a maximum distance measured between the first and the last blanking.

19. The device according to claim 18, wherein, for transmitting data without dimming, an optical power of the light source is increased by a factor which corresponds to a quotient of (a) a time period of the pulse width modulation cycle and (b) the time period of the pulse width modulation cycle reduced by a time period of the blankings.

20. The device according to claim 12, wherein the plurality of partial bright-up times and at least one blanking of the pulse width modulation cycle are distributed across the full period of that pulse width modulation cycle.

21. The device according to claim 12, wherein the pulse duty factor is above 50%.

22. The device according to claim 12, wherein the data symbol transmitted during the pulse width modulation cycle is defined as a function of the respective start times and time periods of all of the blankings within that pulse width modulation cycle.

* * * * *